Patented Apr. 20, 1954

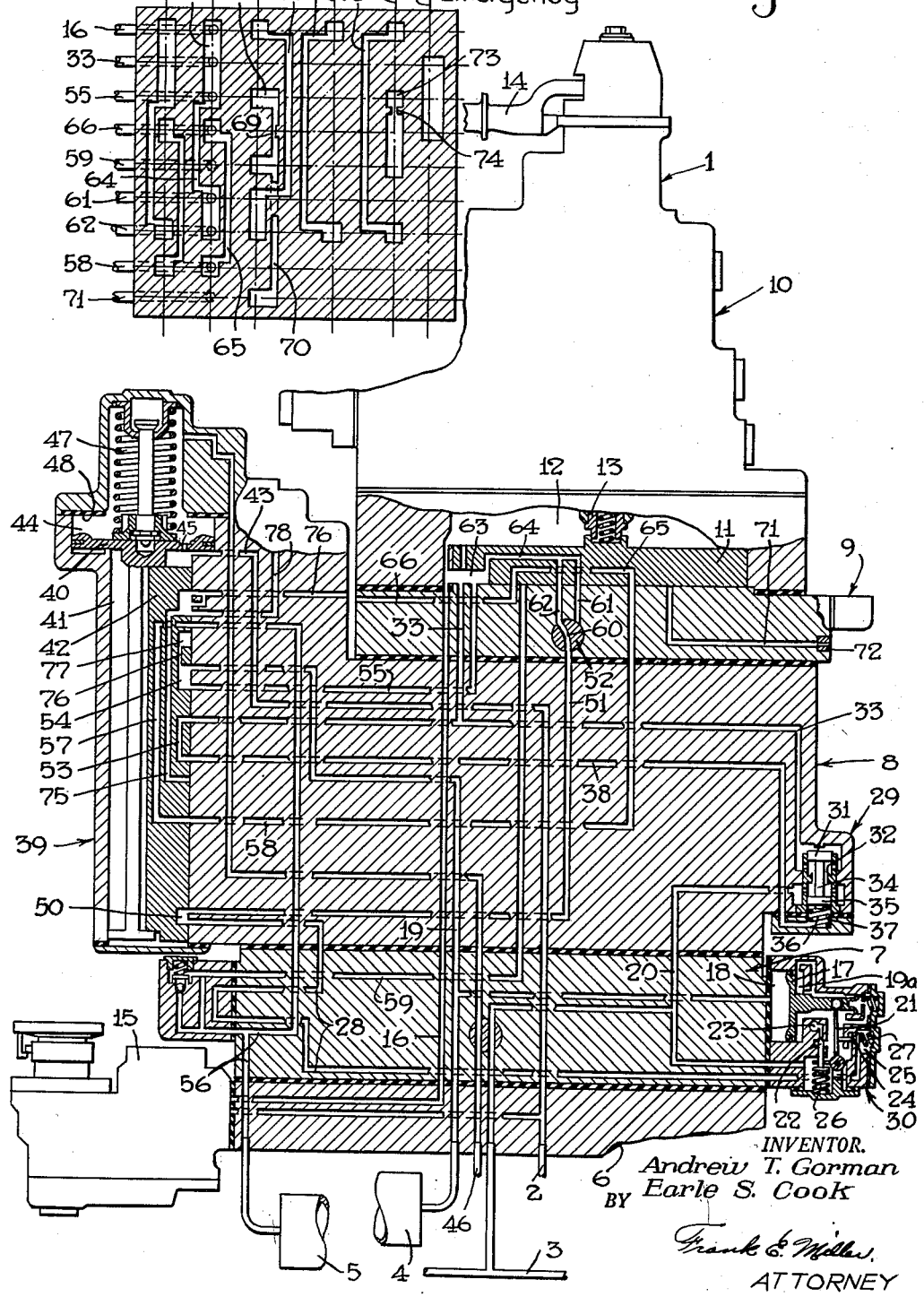

2,676,065

UNITED STATES PATENT OFFICE 2,676,065

FLUID PRESSURE BRAKE APPARATUS

Andrew T. Gorman, Pitcairn, and Earle S. Cook, Forest Hills, Pa., assignors to Westinghouse Air Brake Company, a corporation of Pennsylvania Application March 8, 1951, Serial No. 214,498

3 Claims. (Cl. 303—18)

This invention relates to fluid pressure brakes and more particularly to the type employed on railroad locomotives.

In handling trains down long grades, it has been customary to cycle the brakes, that is, to effect an application of brakes to a desired degree and then after leakage of fluid under pressure from the brake pipe has caused the degree of brake application to increase an undesirable amount to recharge the train brake system during which time the brakes would release down to the resetting of the usual brake cylinder pressure retaining valve devices. After the train brake system was sufficiently recharged a reapplication of train brakes to a desired reduced degree would be effected and the cycle then repeated as necessary until the bottom of the grade was reached. This type of control would of necessity provide a varying degree of train braking and hence of train speed, require a large amount of compressed air for each recharging operation, and further, if sufficient recharge of the brake system were not always obtained a gradual depletion of train charge could result with eventual inadequate braking to hold the train and a runaway or possible wrecking of the train might result.

With the AB brakes now in use on cars in freight service, leakage in the equipment is of an inconsequential amount, but leakage from the brake pipe, in spite of good maintenance can not be adequately controlled. A train conditioned to start a run with brake pipe leakage at a minimum may develop severe leakage for various reasons, such as stretching out the train, going around a curve or gathering slack. It will, however, be seen that if it were not for brake pipe leakage, cycling on a grade could be substantially dispensed with. After having effected an application of brakes, it has therefore been proposed to supply fluid under pressure to the brake pipe to compensate for leakage of fluid under pressure therefrom so as to hold the brake pipe pressure constant at the degree to which it was reduced to effect said application of brakes. By so doing, upon effecting an application of brakes on a grade sufficient to provide a desired braking of a train, the degree of braking will remain substantially constant as long as desired. If the steepness of the grade increases or for some other reason it is deemed necessary to increase the degree of brake application this may be done and the increased application will then remain fixed. Of course if it becomes necessary to reduce the degree of a brake application the application in effect will have to be released and then the brakes reapplied to the desired reduced degree. It will however be noted that cycling due to brake pipe leakage could be eliminated by compensating for such leakage.

One object of the invention is therefore the provision of improved means for accomplishing the above result by supplying fluid under pressure to the brake pipe to compensate for brake pipe leakage and thereby maintain the pressure in the brake pipe at any desired fixed reduced pressure after effecting an application of brakes, this feature hereinafter being referred to as flat maintaining.

In the No. 24RL locomotive brake equipment disclosed in Westinghouse Air Brake Company's instruction pamphlet dated March 1943 there is disclosed an engineer's brake valve device embodying a brake pipe maintaining valve device controlled by opposing pressures of fluid in the brake pipe and usual equalizing reservoir for supplying fluid under pressure to the brake pipe to compensate for brake pipe leakage and thereby maintain brake pipe pressure substantially equal to that in said reservoir. The maintaining valve is effective in a first service position of the brake valve device in which the pressure of fluid in the equalizing reservoir is reduced into the limited volume of a reduction limiting reservoir at a service rate and thence to atmosphere at a much slower rate through a fading maintaining choke. The reduction in equalizing reservoir pressure effected by substantial equalization into the reduction limiting reservoir is such as to effect quick service operation of AB valves to effect a light slack gathering application of brakes on a train while the continued reduction through the fading choke is to so limit supply of fluid under pressure to the brake pipe by operation of the maintaining valve as to prevent brake pipe pressure at the rear of a train increasing by flow of fluid under pressure from the front end sufficient to operate the AB valves to cause the brakes to release, as will otherwise occur if a brake pipe reduction is initiated while charging and before obtaining full charge of a train brake system at which time a so called false pressure gradient is present in the brake pipe. According to the invention this same maintaining valve which provides fading maintaining in first service position of the engineer's brake valve device is employed to provide flat maintaining in the usual service and lap position of said brake valve device as necessary for control of a train down a grade.

Associated with the engineer's brake valve device disclosed in the above referred to Instruction Pamphlet is an application valve device having a normal position opening communication between the reduction limiting reservoir and atmosphere through the fading maintaining choke which is contained in a slide valve in said device. The application valve device is movable automatically to an application position in case of incapacity of the engineer, exceeding a speed limit or the like to close communication through the fading choke and to open the equalizing reservoir to the reduction limiting reservoir for initiating an application of train brakes. After the lapse of a certain period of time from equalization of pressure in the equalizing reservoir into the reduction limiting reservoir, another vent from the equalizing reservoir is opened to effect a further reduction in pressure therein to cause a full service reduction in brake pipe pressure and a full service application of brakes, as desired under the condition to ensure stopping of the train.

The further reduction in equalizing reservoir pressure just mentioned occurs through the brake valve device in running position and if the brake valve device is allowed to remain in running position complete venting of the equalizing reservoir and brake pipe will result. It is unnecessary and undesirable to allow venting of the brake pipe below a full service reduction in pressure therein, so if the engineer is alert he may move his brake valve device to lap position for limiting such reduction to a full service degree.

According to the invention, as above described, fluid under pressure is supplied to the maintaining valve in lap position of the brake valve device to provide flat maintaining. It is not desired to compensate for brake pipe leakage when an automatic application of brakes is effected by operation of the application valve device when the brake valve device is moved to lap position, since if there were sufficient leakage of fluid under pressure from the brake equipment on any car or cars of the train, brake pipe pressure being maintained would cause operation of such equipment to release the brakes on said car or cars which is undesirable under the condition in consideration since braking on all cars is desirable to ensure safety of the train.

Another object of the invention is therefore the provision of improved means for preventing compensation for brake pipe leakage when an automatic application of brakes is in effect.

The fading choke above mentioned is in the slide valve of the application valve device and therefore substantially inaccessible for cleaning when required. Moreover, it may not be desired by some to have the fading maintaining feature but still it might be desired to employ the reduction limiting reservoir and hence first service position of the brake valve device for initiating an application of brakes such as could be obtained by replacing the fading choke with a solid plug.

Another object of the invention is to change the location of the fading choke so that it will be readily accessible for cleaning or replacement by a solid plug.

Still another object of the invention is to control communication between the reduction limiting reservoir and the fading choke through the brake valve rotary valve so that it may be disconnected from the reduction limiting reservoir in lap position of the brake valve device and thereby not interfere with the reduction in pressure in the equalizing reservoir when an automatic application of brakes is effected.

Other objects and advantages will become apparent from the following more detailed description of the invention.

In the accompanying drawing, Fig. 1 is a diagrammatic view of a portion of a locomotive brake apparatus embodying the invention; and Fig. 2 is a development diagram of the rotary valve and seat of said brake valve device.

Description

The brake apparatus embodying the invention may be substantially like that disclosed in the Instruction Pamphlet above referred to, in view of which only those parts are shown in the drawing which are necessary to an understanding of the invention.

As shown in the drawing, the brake apparatus comprises an engineer's brake valve device 1, the usual main reservoir pipe 2, brake pipe 3, equalizing reservoir 4 and a reduction limiting reservoir 5.

The brake valve device 1 is of the usual built up pedestal type comprising a base or pipe bracket 6 to which the pipes and reservoirs above mentioned are connected and upon which there are mounted casing sections 7, 8, 9 and 10, the section 9 comprising on one face a seat for a rotary valve 11 contained in a chamber 12 in the casing section 10 which constitutes in effect a top cover. The rotary valve 11 is connected through a stem 13 to the usual brake valve handle 14. The handle 14 and thereby the rotary valve 11 is rotatable to the usual release, running, first service, lap, service and emergency positions indicated by legends in Fig. 2, the release and emergency positions being not pertinent to an understanding of the invention and will not be referred to again hereinafter.

A feed valve device 15 mounted on the base section 6 is operative to reduce pressure of fluid supplied thereto from the main reservoir pipe 2 and to constantly supply fluid at such reduced pressure to the rotary valve chamber 12 via passage 16.

Associated with the casing section 7 is an equalizing mechanism 30 comprising a piston 17 at one side of which is a chamber 18 open to a passage 19 connected to the equalizing reservoir 4 and at the opposite side of which is a chamber 19a open to a passage 20 leading to brake pipe 3. The piston 17 is connected to the end of one arm 21 of a bell crank, the other arm of which is connected to a brake pipe discharge valve 22 for opening said valve upon movement of said piston in the direction of the left hand from the position in which it is shown in the drawing to thereby open chamber 19a and brake pipe 3 to an atmospheric exhaust passage 23. A maintaining valve 24 contained in a chamber 25 has a stem arranged for engagement by the bell crank arm 21 to unseat said valve and open chamber 25 to the brake pipe chamber 19a upon movement of piston 17 in the direction of the right hand from the position it is shown in the drawing. With the equalizing piston 17 in the position shown in the drawing the discharge valve 22 and maintaining valve 24 are adapted to be closed by springs 26 and 27, respectively. The maintaining valve chamber is open to a passage 28.

Associated with the casing section 8 is a brake pipe cut-off valve device 29 comprising a valve 31 arranged to cooperate with a seat 32 for closing communication between a passage 33 and the passage 20. The valve 31 is connected by a stem 34 to a piston 35 subject on one side to pressure of fluid in passage 20 and on the opposite side to pressure of fluid and pressure of a spring 36 in a chamber 37 open to a passage 38. When pressure of fluid acting on opposite sides of piston 35 is equal, spring 36 will open valve 31 while upon venting of fluid under pressure from chamber 37 brake pipe pressure from passage 20 acting on piston 35 is adapted to seat valve 31.

Also associated with the casing section 8 is an automatic brake application valve device 39 comprising a piston 40 at one side of which is a chamber 41 containing a slide valve 42 connected to said piston for movement therewith and adapted to be constantly supplied with fluid under pressure from the main reservoir pipe 2 via passage 43. At the opposite side of piston 40 is a chamber 44 constantly supplied with fluid under pressure from valve chamber 41 via small port 45 through said piston and which chamber opens to a pipe 46 adapted to be vented in case of incapacitation of an engineer, exceeding a speed limit or the like. With pipe 46 and chamber 44 charged with fluid under pressure via piston port 45 a spring 47 is adapted to move piston 40 and slide valve 42 to a normal position in which they are shown in the drawing, while upon venting of said chamber via said pipe, pressure of fluid in valve chamber 41 acting on piston 40 is adapted to move same and the slide valve 42 to an automatic application position defined by contact of said piston with a gasket 48.

In the normal position of the application slide valve a cavity 50 therein opens passage 28 from the maintaining valve chamber 25 to a passage 51 leading to a maintaining selector cock or valve 52 in the casing section 9; a passage 53 in said slide valve opens passage 33 to passage 38 to permit equalization of pressure on opposite sides of the cut-off valve piston 35 and thereby opening of the cut-off valve 31 by spring 36, the passage 33 being also connected to the seat of the rotary valve 11; and a cavity 54 in said valve opens the equalizing reservoir passage 19 to a passage 55 leading to the seat of rotary valve 11.

The reduction limiting reservoir 5 is connected via passage 56 to the seat of slide valve 42 which has a passage 57 for in normal position of said valve connecting passage 56 to a passage 58 leading to the seat of rotary valve 11. The reduction limiting reservoir is also open through passage 56 and a passage 59 directly to the seat of rotary valve 11.

The maintaining selector cock 52 provided in the casing section 9 has two positions. In the position in which it is shown in the drawing, a passage 60 through the cock establishes communication between passage 51 and a passage 62 while lapping a passage 61, while turning said cock counterclockwise will lap passage 62 and open passage 61 to passage 51. Both passages 61 and 62 lead to the seat of rotary valve 11.

In running position of the rotary valve 11 a cavity 63 therein opens passages 33 and 55 to valve chamber 12, and both passages 61 and 62 are also open to said chamber via a passage 64 and said cavity in said valve. As a result, fluid at feed valve pressure in rotary valve chamber 12 will flow from valve chamber to passage 33 and thence to the brake pipe cut-off valve 31 and at the same time through passage 53 in the application slide valve 42 to passage 38 and the cut-off valve piston chamber 37 whereupon spring 36 acting on piston 35 will open the cut-off valve 31. With the cut-off valve 31 open, fluid under pressure will flow from passage 33 past said valve to passage 20 and thence to passage 19 in the equalizing valve mechanism 30 and to the brake pipe 3 charging said chamber and brake pipe to the pressure supplied by the feed valve device 15.

At the same time as the brake pipe 3 is thus charged, fluid at feed valve pressure supplied to passage 55 will flow through cavity 54 in the application slide valve 42 to passage 19 and thence to the equalizing reservoir 4 and equalizing piston chamber 18. With pressures in chambers 18 and 19a thus equal, the equalizing piston 17 will assume the position in which it is shown in the drawing permitting closure of the brake pipe discharge valve 22 and maintaining valve 24 by the respective springs 26 and 27.

Fluid at feed valve pressure supplied from the rotary valve chamber 12 to passage 62 will, with the selector cock 52 in the position in which it is shown in the drawing, flow through passage 60 in said cock to passage 51 and thence through cavity 50 in the application slide valve 42 to passage 28 and the maintaining valve chamber 25 where it will be blocked against further flow by the closed maintaining valve 24.

With the rotary valve 11 in running position and the application slide valve 42 in normal position, the reduction limiting reservoir 5 is vented via passage 56, passage 57 in said slide valve, passage 58, a cavity 65 in said rotary valve and an atmospheric passage 66.

With the brake pipe 3 and equalizing reservoir 4 charged with fluid at the pressure supplied by the feed valve device 15 and with the reduction limiting reservoir vented as just described, if it is desired to effect a light slack gathering application of brakes on a train the handle 14 and rotary valve 11 will be turned to first service position.

In first service position of rotary valve 11 passages 33 and 55 will be disconnected from the valve chamber 11 but passages 61 and 62 will remain open to said chamber via passage 67 in said valve so as to maintain via passage 62 supply of fluid under pressure from the feed valve device 15 to the maintaining valve chamber 25. In the first service position of the rotary valve 11 passage 55 connected to the equalizing reservoir will be open through a passage 68 containing a service choke 69 in said valve to passage 59 leading to the reduction limiting reservoir 5, the passage 58 also connected to said reservoir being lapped by said rotary valve in first service position. Passage 59 is however connected via a passage 70 in the rotary valve to passage 71 which is open to atmosphere through a fading maintaining choke 72.

Thus upon movement of the rotary valve to first service position, the supply of fluid under pressure to the brake pipe will be cut off while opening the equalizing reservoir 4 to the reduction limiting reservoir 5 will permit pressure of fluid in the former to substantially equalize into the latter at the usual service rate controlled by service choke 69 to effect a relatively small reduction in pressure in the equalizing reservoir, such as six pounds from a normal 70 pounds, after which the pressure in the equalizing reservoir 4 will continue to reduce at a much slower rate through the fading choke 72.

If the reduction in pressure in the equalizing reservoir 4 reduces the pressure in chamber 18 of the equalizing mechanism 30 below brake pipe pressure acting in chamber 19a, the piston 17 will move in the direction of the left hand and open the discharge valve 22 so as to permit fluid under pressure to be vented from the brake pipe 3 for effecting an application of brakes on a train. In case the pressure in the brake pipe 3 drops however upon cutting off of supply of fluid under pressure thereto by moving the rotary valve 11 out of running position, due to leakage or false gradient, at a rate exceeding the service rate of drop in pressure in the equalizing reservoir 4, then the piston 17 will move in the direction of the right hand and open the maintaining valve 24 to supply fluid at feed valve pressure to the brake pipe 3 in an amount sufficient to prevent brake pipe pressure reducing faster than the service rate of reduction in equalizing reservoir pressure.

After substantial equalization of pressure of fluid in the equalizing reservoir 4 into the reduction limiting reservoir 5, the equalizing piston 17 will adjust the discharge valve 22 or maintaining valve 24, as the case may be, to cause or permit brake pipe pressure to reduce at a rate controlled by the further reduction in equalizing reservoir pressure through the fading choke 72.

By the use of first service position, a light application of brakes will be made on a train to cause gentle gathering of train slack, the continued reduction in equalizing reservoir pressure through the fading choke being adapted to so limit supply of fluid under pressure to the brake pipe as to prevent brake pipe pressure to the rear of the locomotive increasing after the usual quick service operation of AB valves on the cars of the train to a degree which would cause release operation of the AB valves as would occur on most cars of a train except a few adjacent the locomotive if an application of brakes were initiated before a train is fully charged.

After the slack in the train has been gathered, then in order to increase the degree of brake application to provide a desired degree of braking on the train, the brake valve device will be turned to service position. In this position of the rotary valve the equalizing reservoir 4 will be opened to the atmospheric passage 66 via a cavity 73 containing a service choke 74 so that pressure of fluid in said reservoir and equalizing piston chamber 18 will be further reduced at a service rate in response to which the equalizing piston 17 will operate to open the discharge valve 22 to effect a corresponding further reduction in pressure in the brake pipe 3 and thereby a corresponding increase in the application of brakes on the train. Upon obtaining the desired reduction in pressure in the equalizing reservoir 4 the brake valve handle 14 and rotary valve 11 will be turned to lap position in which passage 55 from the equalizing reservoir 4 is lapped for thereby bottling up the remaining fluid in said reservoir at the desired reduced pressure.

In service position and lap position the maintaining valve chamber 25 remains open to the rotary valve chamber 12 and feed valve passage 16 via cavities 75 and 76, respectively, in the rotary valve 11 whereby in case brake pipe pressure tends to reduce, due to leakage, below that in the equalizing reservoir 4, the equalizing piston 17 will open the maintaining valve 24 as necessary to compensate for such leakage and thereby hold the pressure in the brake pipe 3 equal substantially to that in the equalizing reservoir 4 so as to prevent such leakage increasing the degree of brake application above that desired.

It will now be seen that when a train is descending a grade, an application of brakes may be initiated in first service position in which the fading maintaining choke 72 is effective to ensure against the release of brakes in case the application is initiated at the time a false gradient is present in the brake pipe. After the application is initiated, the degree of brake application may be increased, and later further increased if necessary, and will then remain at the degree selected as governed by the reduction in pressure in the equalizing reservoir, since by operation of the maintaining valve 24 fluid under pressure will be supplied to the brake pipe to compensate for leakage and thereby prevent such leakage from increasing the brake application to a degree requiring release and then reapplication to a reduced degree. This supplying of fluid under pressure to the brake pipe to compensate for leakage in the service and lap positions of the brake valve device is now termed flat maintaining since it holds brake pipe pressure at a constant reduced pressure, in contrast to the controlled rate of reduction obtained in first service position incident to choke 72 which is known as fading maintaining.

It will be readily apparent that the flat maintaining will eliminate need for the usual cycling of brakes in controlling a train down a grade.

It is, of course, understood that during descent of a grade the steepness of the grade may reduce requiring a reduction in the degree of brake application and train. In such a case it will be necessary for the engineer's brake valve device to be returned to release or running position to recharge the brake system and then be moved back to service and lap position to reapply the brakes to the desired reduced degree. While recharging the brake system the brakes on the train will release down to the setting of the usual brake cylinder pressure retaining valve devices which will hold the train under control until a reapplication can be effected, as well known.

From the above description it will be noted that with the selector cock 52 in the position in which it is shown in the drawing fluid under pressure is supplied from the feed valve device 15 to the maintaining valve chamber via passage 62 in first service, lap and service positions in order to provide fading maintaining and flat maintaining as above described. The No. 24RL locomotive brake apparatus does not embody this flat maintaining feature, and if it is desired that flat maintaining be cut-out and provide only the fading maintaining feature of said apparatus the selector cock 52 may be turned to the position for opening passage 51 to passage 61 which is supplied with fluid under pressure from the feed valve device 15 in first service position via passage 67 in the rotary valve 11 but is not supplied with fluid under pressure in either service or lap position, so as to prevent flat maintenance in the latter two positions.

In case of incapacitation of the engineer, a train exceeding a speed limit or the like, fluid under pressure will be vented from pipe 46 and the application piston chamber 44 due to which the application slide valve 42 will move up to application position. In this position fluid under pressure will be vented from the cut-off valve piston chamber 37 via passage 38, a passage 75 in slide valve 42 and an atmospheric passage 76 whereby brake pipe pressure from passage 20 will actuate piston 35 to close valve 31 and prevent further supply of fluid under pressure to the brake pipe 3. Also in application position of slide valve 42 the equalizing reservoir 4 will be disconnected from passage 55 leading to the rotary valve 11 and connected by way of cavity 54 in said slide valve, a service choke 76 and a cavity 77 to passage 56 leading to the reduction limiting reservoir 5 and to a passage 78, whereby pressure in the equalizing reservoir 4 will equalize into the reduction limiting reservoir 5 to initiate an application of brakes. After a certain lapse of time required for gathering of slack in the train, the pressure in the equalizing reservoir 4 will then further reduce via passage 78 in a manner not pertinent to the invention and which will therefore not be further described except that it will result in an application of brakes on the train necessary to bring it to a stop.

It is however desired to point out that the supply of fluid under pressure to the maintaining valve chamber 24 which provides for fading and flat maintaining of brake pipe pressure during control of the brakes by the brake valve device 1, as above described, is provided through cavity 50 in the application slide valve 42 when in normal position. Upon movement to application position to effect automatically an application of brakes the slide valve 42 interrupts communication between passages 28 and 51 thus cutting off supply of fluid under pressure to the maintaining valve chamber 25 to prevent maintenance of brake pipe pressure against leakage in effecting an automatic application of brakes. This is considered desirable for when a protective application of brakes is effected, as just described, it is of primary importance that the train be adequately braked and under control as might not result if brake pipe leakage were compensated for. For example, if there should be leakage of fluid under pressure from the brake equipment on a car or cars in the train which would reduce the pressure in the equipment below brake pipe pressure the brakes on said car or cars might undesirably release. By cutting out brake pipe maintaining however when an automatic application of brakes is effected, leakage of fluid under pressure from the brake pipe will reduce the pressure therein and ensure that the brakes on any cars, which might otherwise release, will remain applied.

Fading maintaining, such as above described, may not be desired by certain railroads but use of the reduction limiting reservoir 5 in first service position of the brake valve device may be desired to provide an initial measured reduction in pressure in the equalizing reservoir. If such be the case, the fading choke 72 being accessible from outside of the brake valve device may be readily removed and replaced by a solid plug (not shown). The accessibility of the fading choke 72 also facilitates cleaning or replacement whenever necessary.

By controlling communication between the fading choke passage 71 and reduction limiting reservoir passage 59 through the rotary valve 11, said communication will be broken in lap position of said valve so as to prevent reducing pressure in the reduction limiting reservoir 5 and thereby in the equalizing reservoir 4 through the fading choke 72 when an automatic application of brakes is effected.

Summary

It will now be seen that I have provided improved flat maintaining means whereby usual cycling of brakes on a train during descent of a grade may be dispensed with. If desired the flat maintaining means may be cut out and only the usual fading maintaining feature may be retained. I further provide means for cutting out all maintenance of brake pipe pressure in case an automatic application of brakes is effected in order to positively ensure an application under such a condition.

Having now described our invention, what we claim as new and desire to secure by Letters Patent, is:

1. In combination, a brake pipe, a source of fluid under pressure, an equalizing reservoir normally charged with fluid under pressure, an equalizing device comprising a brake pipe discharge valve for venting fluid under pressure from said brake pipe, a maintaining valve controlling communication between a chamber and said brake pipe and an equalizing piston subject to pressure of fluid in said reservoir opposing pressure of fluid in said brake pipe and operative upon a reduction in pressure of fluid in said reservoir when pressure in said reservoir is reduced below that in said brake pipe to open said discharge valve and if pressure in said brake pipe reduces below that in said reservoir to open said maintaining valve, a normally vented reduction limiting reservoir, a brake valve device comprising a rotary valve having a first service position for opening said equalizing reservoir to said reduction limiting reservoir, another service position for venting fluid under pressure from said equalizing reservoir directly to atmosphere, and a lap position for bottling up fluid under pressure in said equalizing reservoir, said rotary valve in said first service position opening said source of fluid under pressure to one passageway and in said service and lap positions another passageway, and valve means operative to open said chamber to either one of said passageways while closing communication to the other.

2. In combination, a brake pipe, a source of fluid under pressure, an equalizing reservoir normally charged with fluid under pressure, an equalizing device comprising a brake pipe discharge valve for venting fluid under pressure from said brake pipe, a maintaining valve controlling communication between a chamber and said brake pipe, and an equalizing piston subject to pressure of fluid in said reservoir opposing pressure of fluid in said brake pipe and operative upon a reduction in pressure of fluid in said reservoir when pressure in said reservoir is reduced below that in said brake pipe to open said discharge valve and if pressure in said brake pipe reduces below that in said reservoir to open said maintaining valve, a brake valve device comprising a rotary valve having a position for supplying fluid under pressure from said source to said brake pipe, said equalizing reservoir and said chamber and another position for venting fluid under pressure from said equalizing reservoir, cutting off supply of fluid under pressure to said brake pipe and maintaining said chamber open to said source of fluid under pressure, and an automatic application valve device comprising movable abutment means movable from a normal position to an application position, means responsive to movement of said abutment means to said application position to cut off supply of fluid under pressure to said brake pipe and reservoir and for venting fluid under pressure from said reservoir, and means cooperative with said brake valve device to control communication between said source and said chamber and operative by said abutment means in said application position to close such communication.

3. In combination, a brake pipe, a source of fluid under pressure, an equalizing reservoir normally charged with fluid under pressure, an equalizing device comprising a brake pipe discharge valve for venting fluid under pressure from said brake pipe, a maintaining valve controlling communication between a chamber and said brake pipe, and an equalizing piston subject to pressure of fluid in said reservoir opposing pressure of fluid in said brake pipe and operative upon a reduction in pressure of fluid in said reservoir when pressure in said reservoir is reduced below that in said brake pipe to open said discharge valve and if pressure in said brake pipe reduces below that in said reservoir to open said maintaining valve, a reduction limiting reservoir, a brake valve device comprising a rotary valve having a position for supplying fluid under pressure from said source to said brake pipe and said equalizing reservoir and for venting fluid under pressure from said reduction limiting reservoir and having a first service position for opening said equalizing reservoir to said reduction limiting reservoir, another service position for venting fluid under pressure from said equalizing reservoir directly to atmosphere and a lap position for bottling up fluid under pressure in said equalizing reservoir, said rotary valve in all of the above named positions establishing a communication for supplying fluid under pressure from said source to said brake pipe, and an automatic application valve device comprising movable abutment means having a normal position and operative therefrom to an application position, means responsive to movement of said abutment means to said application position for reducing pressure of fluid in said equalizing reservoir and means operable by said abutment means in said application position to close said communication between said rotary valve and chamber and operative in said normal position to open such communication.

References Cited in the file of this patent
UNITED STATES PATENTS

| Number | Name | Date |
| --- | --- | --- |
| 1,314,975 | Neal | Sept. 2, 1919 |
| 1,339,679 | Turner | May 11, 1920 |
| 1,668,009 | Farmer | May 1, 1928 |
| 1,803,798 | Greenlee | May 5, 1931 |
| 1,935,791 | Farmer | Nov. 21, 1933 |
| 2,055,105 | Hewitt | Sept. 22, 1936 |
| 2,038,168 | Farmer | Apr. 21, 1936 |
| 2,322,042 | McClure | June 15, 1943 |